(12) United States Patent
Gage et al.

(10) Patent No.: US 10,380,124 B2
(45) Date of Patent: Aug. 13, 2019

(54) SEARCHING DATA SETS

(71) Applicant: Oracle International Corporation, Redwood Shores, CA (US)

(72) Inventors: Jason Gage, San Francisco, CA (US); Timothy Eager, Fullerton, CA (US); Qian Jiang, San Francisco, CA (US); Gerhard Brugger, Los Angeles, CA (US)

(73) Assignee: Oracle International Corporation, Redwood Shores, CA (US)

( * ) Notice: Subject to any disclaimer, the term of this patent is extended or adjusted under 35 U.S.C. 154(b) by 313 days.

(21) Appl. No.: 15/286,605

(22) Filed: Oct. 6, 2016

(65) Prior Publication Data
US 2018/0101532 A1   Apr. 12, 2018

(51) Int. Cl.
G06F 16/903    (2019.01)
G06F 16/2457   (2019.01)
G06F 16/9532   (2019.01)

(52) U.S. Cl.
CPC .. G06F 16/24578 (2019.01); G06F 16/90344 (2019.01); G06F 16/9532 (2019.01)

(58) Field of Classification Search
CPC ........... G06F 17/30687; G06F 17/3069; G06F 17/30663; G06F 17/30979; G06F 16/9532; G06F 16/90344
See application file for complete search history.

(56) References Cited

U.S. PATENT DOCUMENTS

| 6,611,825 | B1* | 8/2003 | Billheimer ........ G06F 17/30616 382/156 |
| 6,999,959 | B1* | 2/2006 | Lawrence ......... G06F 17/30864 |
| 7,222,117 | B1* | 5/2007 | McGrogan ............ G06F 12/109 |
| 7,603,342 | B2 | 10/2009 | Gosse et al. |
| 7,647,294 | B2 | 1/2010 | Fairbanks, Jr. et al. |
| 7,647,338 | B2 | 1/2010 | Lazier et al. |
| 8,290,967 | B2 | 10/2012 | Vailaya et al. |
| 8,315,849 | B1* | 11/2012 | Gattani ................... G06F 17/28 704/10 |
| 8,489,604 | B1* | 7/2013 | Sadovsky ......... G06F 17/30864 707/706 |
| 2006/0235843 | A1* | 10/2006 | Musgrove ......... G06F 17/30616 |

(Continued)

OTHER PUBLICATIONS

Documents and Indexes, https://cloud.google.com/appengine/docs/python/search/, Oct. 4, 2016, 15 pages.

(Continued)

Primary Examiner — Marc S Somers
(74) Attorney, Agent, or Firm — Kraguljac Law Group, LLC

(57) ABSTRACT

A method of searching a plurality of data sets with a search query may include receiving the search query, where the search query may include one or more tokens. The method may also include accessing the plurality of data sets, and calculating maximum possible search scores for each of the plurality of data sets. The method may additionally include identifying a subset of the plurality of data sets for which the corresponding maximum possible search scores exceed a threshold score. The method may further include calculating search scores for the subset of the plurality of data sets, and providing the a result list based on the search scores.

16 Claims, 14 Drawing Sheets

(56) References Cited

U.S. PATENT DOCUMENTS

2011/0106797 A1* 5/2011 Palakodety ....... G06F 17/30707
707/728
2014/0074826 A1 3/2014 Cooper et al.

OTHER PUBLICATIONS

Phrase Matching, https://www.elastic.co/guide/en/elasticsearch/guide/current/phrase-matching.html, © 2016, 5 pages.
Search Engines and Searching Considerations, http://www.edrm.net/resources/guides/edrm-search-guide/search-engines-and-searching-considerations, © 2005-2016, 7 pages.
Gauch et al., Automatic Word Similarity Detection for TREC 4 Query Expansion, 1995, 10 pages.
Liddy et al., How a Search Engine Works, Searcher, vol. 9, No. 5, May 2001, 8 pages.

* cited by examiner

Search Component — 502

JML

SENT("configuration")

Excerpt — 506

Configuring Rates and Weights in the Scheduler Hierarchy

Scope Results: 29 results — 508

| DOC ID | Coll ID | Scope Type | Start | End | Score | Raw Score | Unique ID |
|---|---|---|---|---|---|---|---|
| 1404 | 4 | Sentence |  | 153 | 181 | 100000 | 8350012 |
| 1405 | 4 | Sentence | 19 | 27 | 100000 | 8350013 |
| 1406 | 4 | Sentence | 14 | 17 | 100000 | 8350014 |

Details — 512

| Start | End | Excerpt |
|---|---|---|
| 15 | 19 | Quality of Service Configuration Gui |
| 292 | 312 | JUNOSe Software for E Series Broa |
| 1030 | 1112 | Such limits may restrict use to a ma |
| 3464 | 3409 | Configuring Queue Profiles for Bette |
| 3473 | 3479 | Configuring Dropping Behavior with |
| 3508 | 3515 | Configuring Rates and Weights in th |
| 3519 | 3523 | Configuring Strict-Priority Schedulin |

Raw Result

| UniqueID | DocID | Collection... | RangeCo... |
|---|---|---|---|
| 8390012 | 1404 | 4 | 92 |
| 8390013 | 1405 | 4 | 1961 |
| 8390014 | 1406 | 4 | 1355 |
| 8390015 | 1407 | 4 | 1174 |
| 8390016 | 1408 | 4 | 1753 |
| 8390017 | 1409 | 4 | 3168 |
| 8390018 | 1410 | 4 | 2476 |

Candidate Scope:

When you configure explicit routing rather than hop-by-hop routing for MPLS, the route the LSP takes is defined by the ingress node.  ⌒802

Tokens (28):

[When] [you] [configure] [explicit] [routing] [rather] [than] [hop] [-] [by] [-] [hop] [routing] [for] [MPLS] [,] [the] [route] [the] [LSP] [takes] [is] [defined] [by] [the] [ingress] [node] [.]  ⌒804

FIG. 8

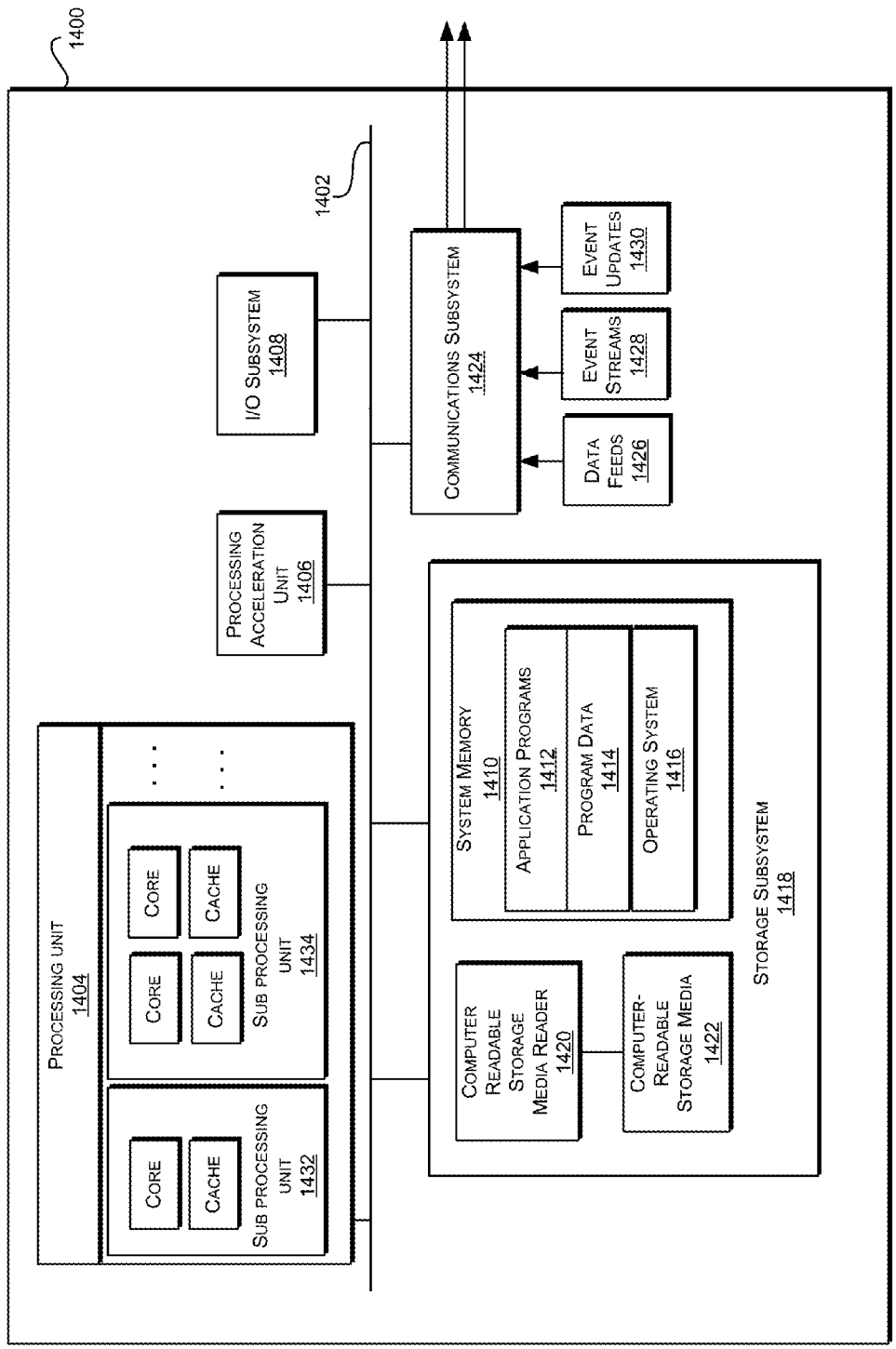

SEARCHING DATA SETS

BACKGROUND

Search engines provide an interface to data sets and enable users to specify criteria about a datum of interest such that the search engine can locate matching items. The search criteria are referred to as a search query. In the case of text search engines, the search query may typically be expressed as a set of words that identify the desired concept that one or more documents may contain. The list of items that meet the criteria specified by the query is typically sorted or ranked. Ranking items by relevance (from highest to lowest) reduces the time required to find the desired information. Probabilistic search engines rank items based on measures of similarity between each item and the query. Boolean search engines typically only return items which match exactly without regard to order.

BRIEF SUMMARY

In some embodiments, a method of searching a plurality of data sets with a search query may include receiving the search query. The search query may include one or more tokens. The method may also include accessing the plurality of data sets, andcalculating maximum possible search scores for each of the plurality of data sets. The method may additionally include identifying a subset of the plurality of data sets for which the corresponding maximum possible search scores exceed a threshold score. The method may further include calculating search scores for the subset of the plurality of data sets, and providing the a result list based on the search scores.

In some embodiments, a non-transitory, computer-readable medium may include instructions that, when executed by one or more processors, cause the one or more processors to perform operations including receiving a search query. The search query may include one or more tokens. The operations may additionally include accessing a plurality of data sets, and calculating maximum possible search scores for each of the plurality of data sets. The operations may also include identifying a subset of the plurality of data sets for which the corresponding maximum possible search scores exceed a threshold score. The operations may further include calculating search scores for the subset of the plurality of data sets, and providing the a result list based on the search scores.

In some embodiments, a system may include one or more processors and one or more memory devices including instructions that, when executed by the one or more processors, cause the one or more processors to perform operations including receiving a search query. The search query may include one or more tokens. The operations may also include accessing a plurality of data sets, and calculating maximum possible search scores for each of the plurality of data sets. The operations may additionally include identifying a subset of the plurality of data sets for which the corresponding maximum possible search scores exceed a threshold score. The operations may further include calculating search scores for the subset of the plurality of data sets, and providing the a result list based on the search scores.

In any embodiments, one or more of the following features may be included in any combination and without limitation. Calculating the search scores for the subset of the plurality of data sets may include dividing a first data set in the plurality of data sets into a plurality of scopes. Calculating the search scores for the subset of the plurality of data sets may include generating search scores for each of the plurality of scopes by comparing each of the plurality of scopes to the search query. Calculating the search scores for the subset of the plurality of data sets may include using a largest search score from the plurality of scopes to generate a matrix score for the first data set. Calculating the search scores for the subset of the plurality of data sets may include dividing the largest search score from the plurality of scopes by a maximum possible search score for the first data set. The matrix score may contribute approximately 10% to a search score of the first data set. Calculating the maximum possible search scores may include calculating a match score component comprising a number of tokens in the search query multiplied by a constant. Calculating the maximum possible search scores may include calculating a proximity score component comprising a number of tokens in the search query multiplied by a constant. Calculating the maximum possible search scores may include calculating a quality score component comprising a square of a highest possible slot value for tokens in the search query multiplied by a number of tokens in the search query. Calculating the maximum possible search scores may include calculating an order score component comprising a number of ordered pairs in tokens in the search query multiplied by a constant. Calculating the scores may include calculating a match score component comprising a number of tokens in the search query matched in a scope of one of the plurality of data sets multiplied by a constant. Calculating the scores may include calculating a proximity score component comprising a number of tokens in the search query matched in a scope of one of the plurality of data sets multiplied by a constant and reduced by a number of gaps between matched tokens. Calculating the scores may include calculating a quality score component comprising a sum of squares of slot values of tokens in the search query matched in a scope of one of the plurality of data sets. Calculating the scores may include generating a two-dimensional matrix, where a first dimension represents tokens in the search query, and a second dimension represents tokens found in a scope of one of the plurality of data sets. The two-dimensional matrix may be represented in memory using a plurality of memory maps for occupied entries in the two-dimensional matrix. Calculating the search scores may include calculating a fitness score component comprising a number of matched tokens in the search query multiplied by a constant, reduced by a difference between a scope length and the number of matched tokens in the search query. Calculating the search scores may include calculating an order score component comprising a number of matched ordered pairs of tokens in the search query multiplied by a constant. Calculating the search scores may include calculating a title score component comprising a number of tokens in the search query matched in a title of one of the plurality of data sets multiplied by a constant.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 5 illustrates a user interface representing document search results using a particular search component, according to some embodiments.

FIG. 8 illustrates a candidate scope from a data set, according to some embodiments.

FIG. 14 illustrates an exemplary computer system, in which various embodiments may be implemented.

DETAILED DESCRIPTION

Described herein, are embodiments for emphasizing exact or near-exact matches in generating search scores for data sets in a collection. An existing search algorithm pipeline can be modified to incorporate a "matrix score" that is specifically generated to emphasize exact matches between the language/intent of a search query and the tokens found in a candidate document or scope. A two-dimensional matrix representation can be used to simplify calculations and reduce processing time for calculating the matrix score. The matrix score can then be added into the overall search score as a percentage to possibly increase the overall search score when exact matches are found, and to reduce the overall search score when no exact matches are found.

Figure 1:
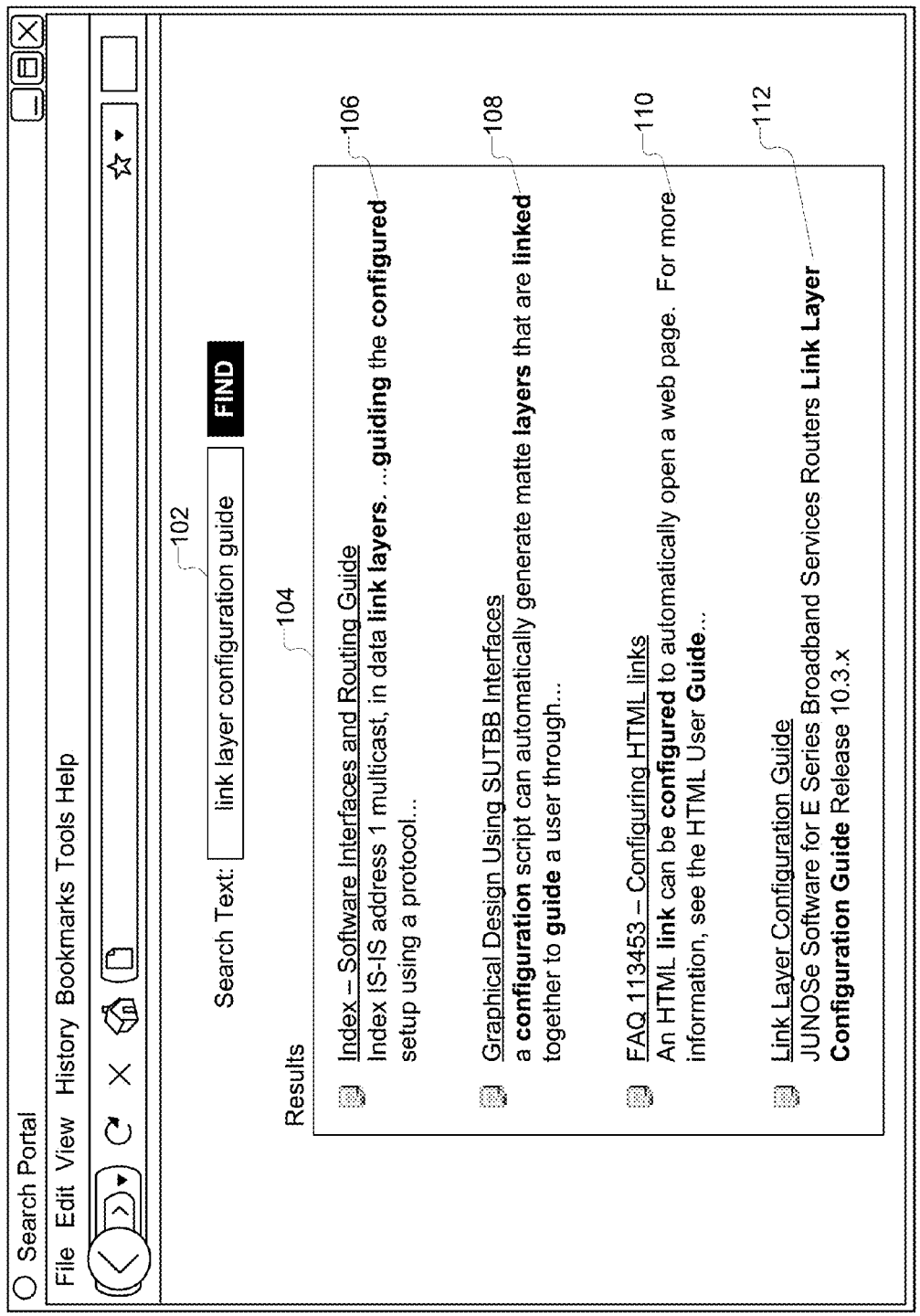
FIG. 1 illustrates an example of the natural language search applied to a defined search space, according to some embodiments.

FIG. 1 illustrates an example of the natural language search applied to a defined search space, according to some embodiments. A search interface 100 includes a search string 102 received as an input to a search engine for searching the defined search space. A natural language search takes the terms used in the search string 102 and expands them to include other terms having similar meanins. For example, search string 102 includes the term "configuration." The natural language search would take the term "configuration" and expand that term to include other similar terms with the same meaning, such as "configured," "configure," and "configuring." Each of the terms in the search string 102 can be expanded to capture many different terms that can have the same meaning. This allows users to ask questions in many different ways where the underlying intent is the same.

There are many different algorithms for determining a search score for a particular document in response to receiving a search query. Generally, terms in the documents are compared with terms in the search query to generate a document score. Documents are then returned in response to the search query and ordered according to their document scores. However, prior to this disclosure, a number of problems existed with using natural language searches in closed search spaces.

A result set 104 of the search interface 100 returned in response to the query of the search string 102 illustrates one such problem. The result set 104 ranks the documents in score order. In this example, the first three results 106, 108, 110 in the result set 104 are listed first because they likely have a higher search score than result 112. Search scores can be based on a number of different factors. The higher score of results 106, 108, 110 may be due to various factors, such as each of the individual search terms from the search string 102 appearing more frequently in the results 106, 108, 110, a larger proportion of the results 106, 108, 110 including terms from the search string 102, and so forth. However, even though result 112 has a lower search score, result 112 may be more likely to answer a query posed by the search string 102 because it includes an exact or near-exact match with the search string 102. Even though result 112 includes a exact or near-exact match to the search string 102, the search score may still be lower than results 106, 108, 110 if the terms in the search string 102 do not occur often enough in result 112.

The embodiments described herein are designed to search documents that may include approximate, near-exact, and/or exact matches to the search string 102, and to add emphasis to those results that include near-exact and/or exact matches. If exact matches exist, then these embodiments can highlight the exact match in contrast to the inexact matches. Throughout this disclosure, the term "exact match" may be used interchangeably with the term "near-exact match."

It is important to contrast a natural-language search with an open web search, like the search that is performed by the Google® search engine. Open web searches are very good at finding information when a user knows the document they want to find but does not know where to find it. In contrast, a natural-language search is best for searching a defined search space, such as a database, an FAQ, a customer service forum, a thread of comments, call-center help files, and so forth. In these defined spaces, users are usually asking a question, and expanding the search string 102 as described above will help bring in documents that are relevant to the intent of the user's search question. The embodiments described here in are designed to blend the advantages of these two types of searches, by highlighting exact-match phrases in search documents while still maintaining the flexibility of the natural-language search.

Figure 2:
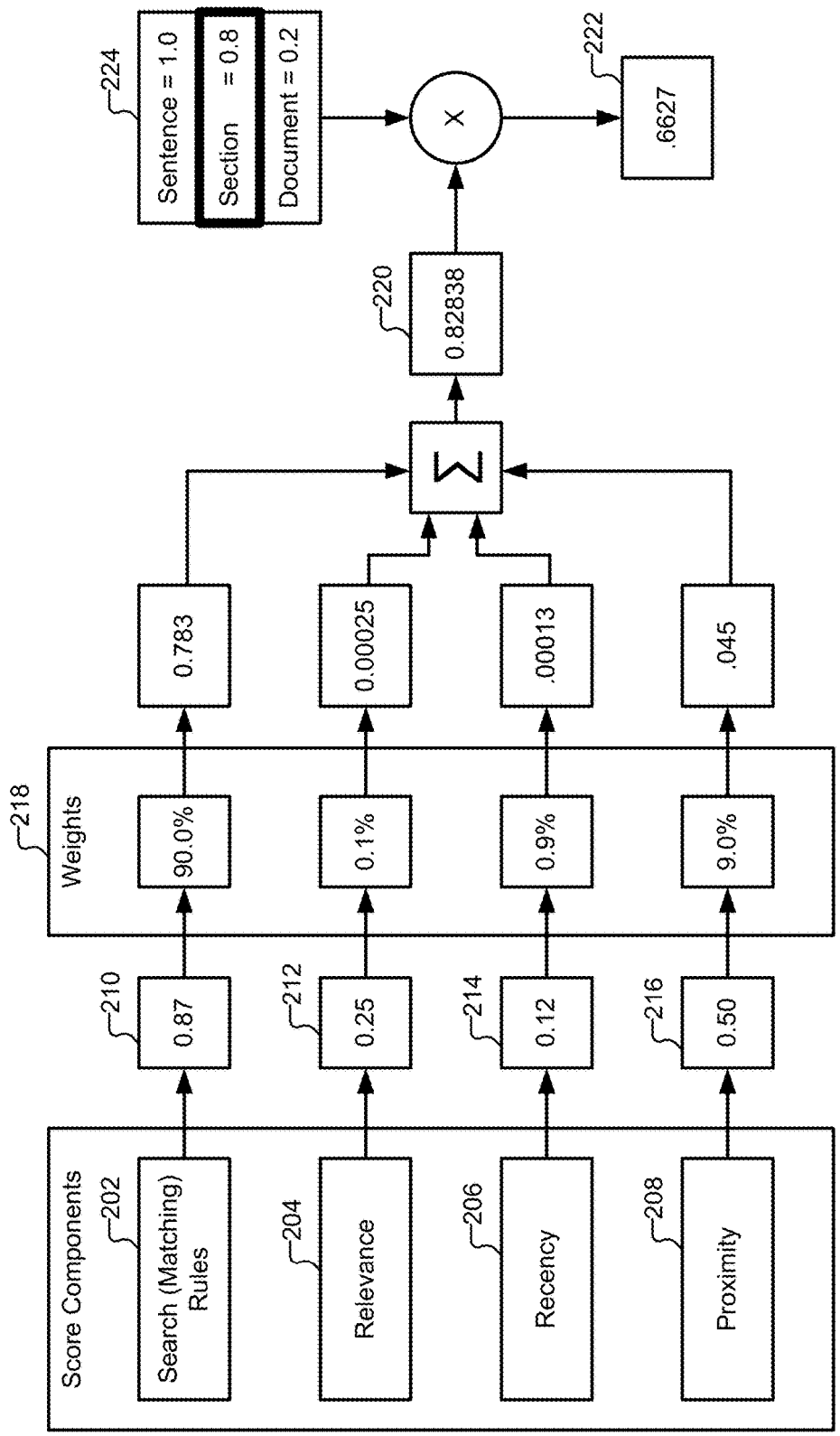
FIG. 2 illustrates a system for searching documents, according to some embodiments.

FIG. 2 illustrates a system for searching documents, according to some embodiments. A search factor 202 comprises a score derived from a set of matching rules. These matching rules basically determine whether or not a term from the search text matches a term in the document being searched. For example, a single term such as the noun "configuration" can be matched with other forms of the same word, as well as different parts of speech, such as the verb "configured." The rules can generate a match score based on how many steps away from the original search term the algorithm has to move in order to match a term in the document. The search rules can weigh and aggregate each match in order to generate an overall score from the search factor 202 for the document being searched. The search rules can vary according to each application, but in some embodiments, the search rules will be the predominant factor in the overall document score. For example, the score from the search factor 202 can be multiplied by a predetermined weight (e.g., 87%) to determine the total contribution from the search factor 202 relative to other score factors in the overall search score.

The relevance factor 204 generates a score based on a comparison between the frequency of search terms in a particular document versus the frequency of search terms in all of the documents in the search space. For example, if search terms occur frequently in all documents, then the fact that a search term may occur frequently in a single document may not be significant. In contrast, if search terms occur infrequently in most documents, then the fact that a search term occurs frequently in a single document may be quite significant. The relevance factor 204 can also be multiplied by a predetermined weight to determine the total contribution from the relevance factor 204 in the overall search score.

The recency factor 206 generates a score based on how recently the document being search was acquired and published. This is generally a document-level score. The recency factor 206 may be particularly useful for knowledge-base documents. These types of documents may have many different versions and may be periodically updated within the knowledge base. The recency factor may generally favor later versions of a document over earlier versions of a document. This ensures that the search returns the most up-to-date results.

A proximity factor 208 generates a score based on roughly how close together the search terms are in a particular document. If the search terms occur in the same sentence, they will receive a higher score that if the search terms occur in the same paragraph, page, or document. Various algorithms can be used in order to score proximity, such as statistical methods, distribution methods, and so forth. While the particular methods used to determine proximity of all the search terms within the document is beyond the scope of this disclosure, the resulting proximity score will generally be higher for results that are more closely grouped together within a document as opposed to results that are scattered throughout a document.

As was the case with the other factors, the recency factor 206 and the proximity factor 208 may each be individually multiplied by a predetermined weight to determine the total contribution from each of these factors. Before being multiplied by the predetermined weight, the scores from each factor can be normalized on a scale from 0.0 to 1.0. A final factor score 210, 212, 214, 216 can be generated by each of the score factors that is scaled from 0.0-1.0. After generating the set of factor scores 210, 212, 214, 216 based on the score factors 202, 204, 206, 208 described above, an aggregate score 220 can be generated for the document by multiplying each of the factors scores 210, 212, 214, 216 by individual weights 218. The weights 218 can be set by search designers in order to optimize search results. The value selected for the weights 218 can depend upon the type of search space being searched. For example, some knowledge bases may have highly specific documents where the factor score 210 of the search factor 202 may strongly influence search results, resulting in a weight of 90%. In another example, a particular knowledgebase may have only the latest version of a document available, which can result in a lower recency weight of 0.9%.

The aggregate score 220 can then be used to generate a final document score 222. The final document score 222 can be generated by multiplying the aggregate score 220 by a scope score 224. The scope score 224 can comprise another scaler between 0.0 and 1.0 based on whether the search terms were found in the same sentence (1.0), whether the search terms were found in the same section (0.8), or whether the search terms were found in the same document (0.2). The final document score 222 for a particular document can be compared to the final scores for the rest of the documents in the search space, and the results can be ordered based on search scores in a final result list to be displayed on a display device.

The document scoring system of FIG. 2 generally provides a fast and accurate method of scoring documents in a defined search space. However some of the embodiments described herein can alter certain sections of the document scoring system to emphasize exact matches of search term sequences as described above. In these embodiments, the search factor 202 can be altered to not only match variations of search terms found in a specific document, but to also consider the ordering and space between each term to generate a higher factor score 210 when exact matches are found. Consequently, these embodiments may also replace, minimize, or eliminate the importance of the other factors 204, 206, 208 with their associated factor scores 212, 214, 216 in generating the final document score 222 of the document. As used herein, the term "exact match" may include matches that are exact, as well as matches that are nearly exact, such as 98% matches, 95% matches, 93% matches, 90% matches, and/or the like.

Figure 3:
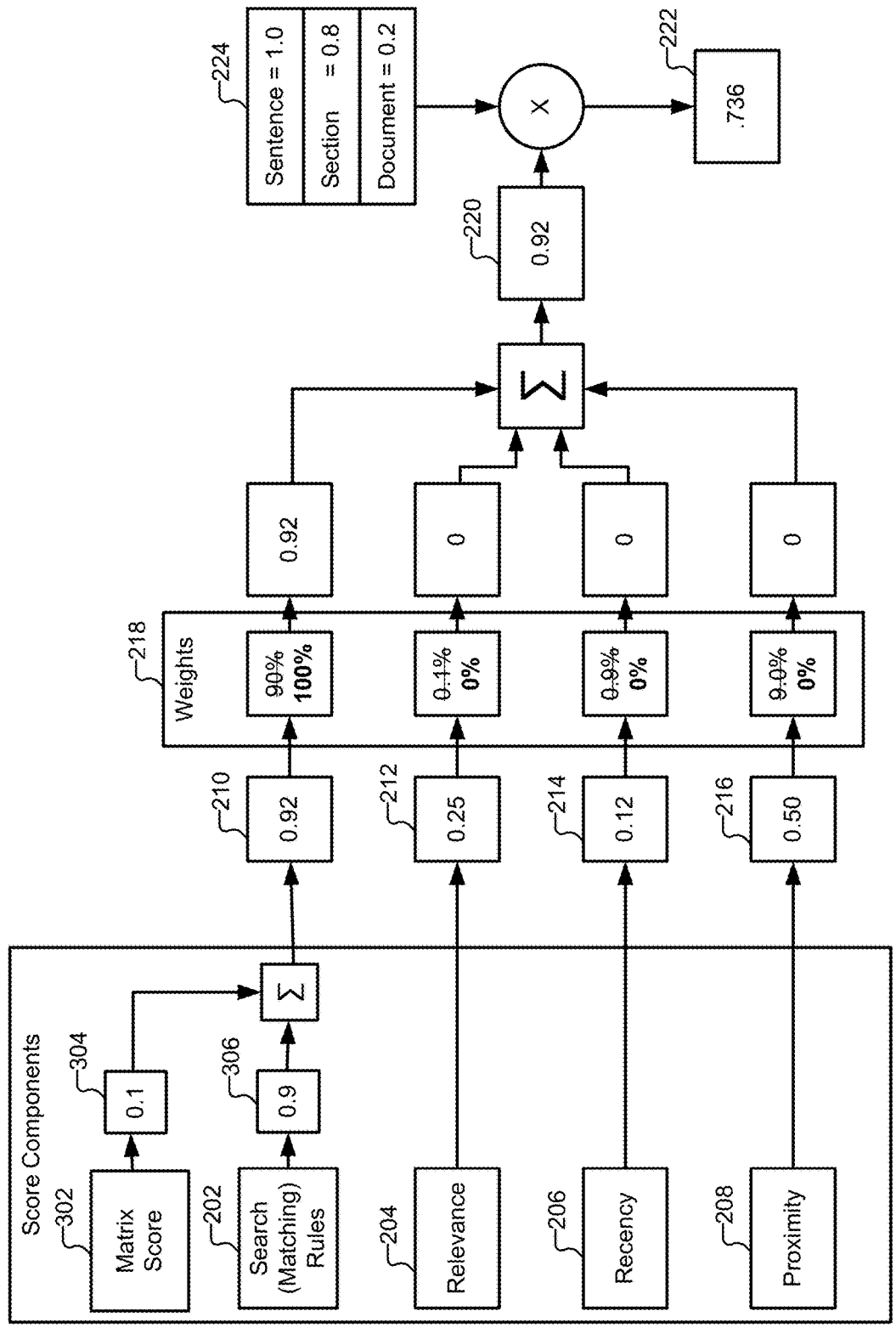
FIG. 3 illustrates a modified system for determining a search score for a document to include matrix score, according to some embodiments.

FIG. 3 illustrates a modified system for determining a search score for a document to include matrix score 302, according to some embodiments. The matrix score 302, described in greater detail below, can be added to an existing search algorithm pipeline. Instead of generating a completely new algorithm, some embodiments can simply incorporate the matrix score 302 into the existing search algorithm by manipulating the weights 218 applied to each of the search factors. In this embodiment, the matrix score 302 can be combined with the search score 202 proportionally, according to constants 304, 306. For example, the matrix score 302 can be weighted to account for approximately 10% of the search score, while the search factor 202 can be weighted to account for approximately 90% of the search score.

As will be described in greater detail below, the matrix score 302 can be specifically designed to account for relevance and proximity. In some embodiments, continuing to also include the contribution of the relevance factor 204 and/or the proximity factor 208 could result in over-emphasizing these aspects of the search algorithm. Additionally, the effect of the recency factor 206 can also be reduced in light of the matrix score 302. Instead of not calculating these factors 204, 206, 208, the scores 212, 214, 216 for these factors may still be calculated, and the weights 218 can be adjusted to minimize or cancel out their effects. For example, one embodiment may give 100% of the weight to be combined search factor 202 and matrix score 302, while reducing the weights of the other factors 204, 206, 208 to 0%.

Initially, adding an additional set of calculations for the matrix score 302 while continuing to calculate the other four factor scores 210, 212, 214, 216 would appear to add additional overhead to the search algorithm pipeline and thereby increase the time and processing power required to calculate a single search score for a single document. However, incorporating the additional calculations of the matrix score 302 led to the unexpected result of actually reducing the processing power and calculation time required to score a set of documents. Although not shown in FIG. 3, the algorithm described in FIG. 2 often resulted in tie scores for many documents in the document said. Therefore, additional time-consuming calculations were required to determine how ties should be broken between documents before being displayed as a search result set. Although adding the matrix score 302 may require more calculations to score a single document, the search score for a single document was more fine-grained. Therefore, when an entire set of documents were scored, there were far fewer ties, and thus the costly overhead of determining how to break these ties could be eliminated. In fact, this algorithm has been demonstrated to reduce the overall processing power and time required to score a set of documents, despite the extra calculations used to calculate the matrix score 302. As described below, the matrix score 302 can be calculated very efficiently by representing portions of the target document and the search query as a two-dimensional matrix, thereby reducing the calculations and comparisons to integer arithmetic.

Figure 4:
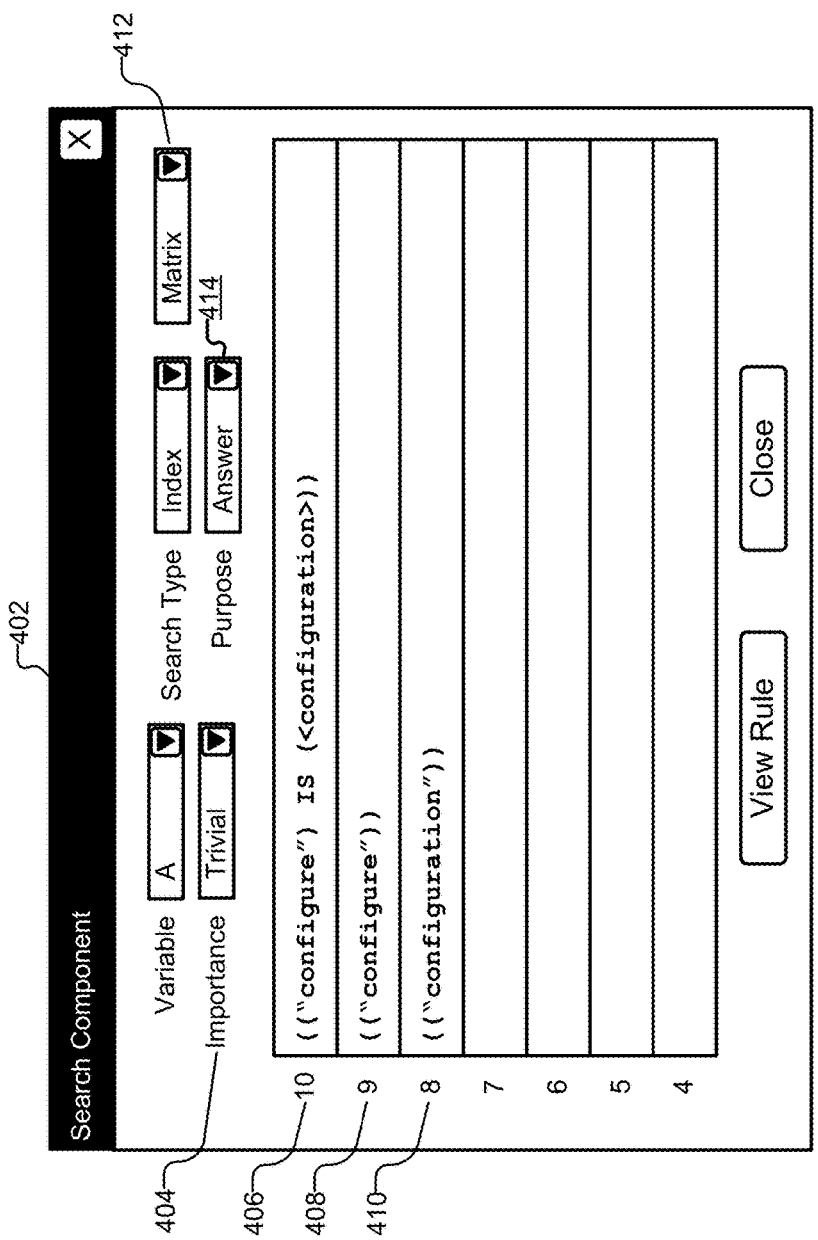
FIG. 4 illustrates a representation of a data structure for a search component, according to some embodiments.

FIG. 4 illustrates a representation of a data structure for a search component, according to some embodiments. By way of example, the following figures use a search query comprising the phrase "configured explicit routing." When the search query is received, the search algorithm will initially break the search query down into a set of discrete tokens. In this case, the search query will be broken down into the three tokens <configure>, <explicit>, and <routing>. Next, each of the tokens in the search query can be used to generate a "search component," which is a data structure that represents a collection of meanings associated with each token. For example, the user interface 402 of FIG. 4 illustrates a search component for the token <configure> in the search query. The user interface 402 includes user-editable fields, such as the drop-down box 412 that lets a user assign the component to the matrix score, drop-down box 414 that determines where in the search result page the result should be displayed, and drop-down box 404 that provides a relative overall importance of the token. Relative scores for different importance levels (trivial, minor, important, very important, required) are listed below in table 1.

TABLE 1

Importance Levels

| Category | Score |
| --- | --- |
| Required | 99,991-100,000 |
| Very Important | 9,991-10,000 |
| Important | 991-1,000 |
| Minor | 91-100 |
| Trivial | 1-10 |

User interface 402 also illustrates different numbered lines referred to as "slots" 406, 408, 410 representing different concepts that can be related to the corresponding token in the search query. Each of the slots are ordered such that they descend away from the original token in the search query. For example, slot 10 (406) would be considered the closest to the original token in the search query. The word "configure" is linked the concept "configuration" in a language ontology that can be used to determine an intent from words in the search query. This allows the search queries to be expanded to cover concept meanings rather than being tied exclusively to the exact terminology used in the search query. In layman's terms, there are many different ways to ask the same question, and the search algorithm should return a similar answer regardless of how the particular question is asked. However, by expanding the original search terms to encompass the larger concepts and meanings, the original search algorithms inherently deemphasized the importance of exact matches of search query terminology in favor of documents that appear to relate to the overall intent of the search query.

In order to score documents that use the exact terminology of the search query, each of the slots 406, 408, 410 are ordered such that the lower-numbered slots are considered to be farther away from the original search terminology. For example, slot 10 (406) best represents the literal terminology used in the search query combined with the corresponding intent represented by the word "configure." Moving one conceptual space away from the original search terminology, slot 9 (408) represents the literal token "configure" without being tied to the "configuration" intent. Next, slot 8 (410) represents a variation on the literal word used in the search query by changing "configure" to "configuration." Although not shown in FIG. 4 for the sake of simplicity, additional slots can be added to the search component that gradually move away from the original terminology and intent of the search query.

FIG. 5 illustrates a user interface 502 representing document search results using a particular search component, according to some embodiments. Instead of comparing each slot in a search component to an entire document, documents can be broken down into a plurality of scopes. For example, in a text document, individual scopes can represent individual sentences. User interface 502 illustrates the results for comparing slot 8 (410) "configuration" in FIG. 4 with the individual scopes found in a collection of documents. The excerpt 506 shows a specific scope to which the selected slot 504 is compared. The scope results 508 show a summary of individual scope results that can be identified by document IDs, start positions, and end positions within each document. The details section 512 illustrates specific details of each scope match for the various documents, with the highlighted scope match illustrated in the excerpt 506. The results of FIG. 5 are meant to illustrate how each slot in a particular search component derived from a token in the search query can be compared to scopes in a collection of documents. The algorithm described below shows how this process can be done efficiently using maximum possible scores and matrix representations.

Figure 6:
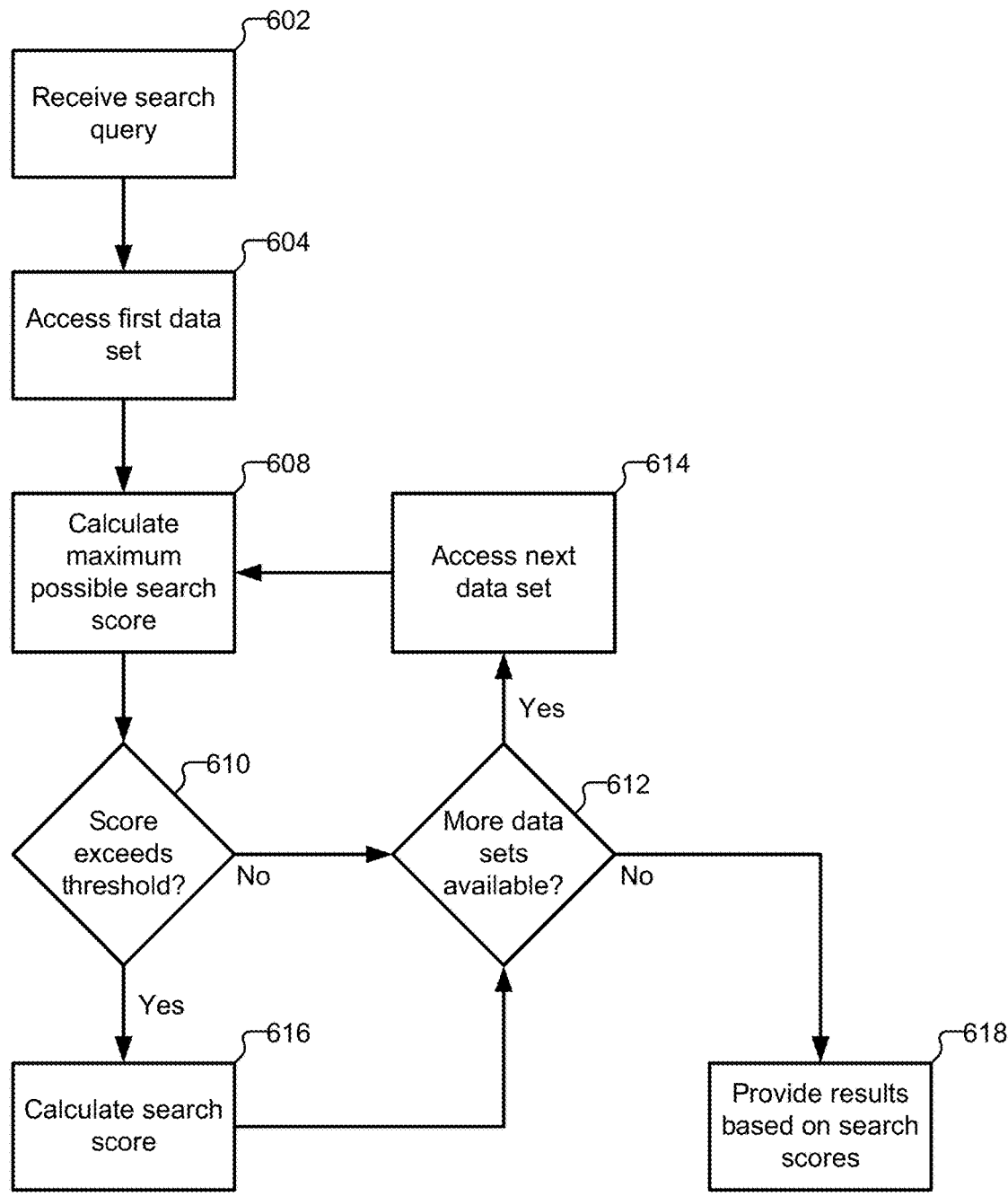
FIG. 6 illustrates a flowchart of a method for efficiently generating search scores for a plurality of data sets, according to some embodiments.

FIG. 6 illustrates a flowchart of a method for efficiently generating search scores for a plurality of data sets, according to some embodiments. Because calculating the entire search score for a particular document can be time-consuming, the time required to generate search scores for a collection of documents can be greatly reduced by first calculating a maximum possible search score for each document, then only calculating the full search score for documents for which the maximum possible search score exceeds a certain threshold. As described below, calculating a maximum possible search score for a particular document can be done very efficiently using the number of search components derived from the search query, number of slots per search component, and the size of each particular document. Calculating the maximum possible search score does not require actually comparing search components from the search query to the text of the document. Therefore, calculating the maximum possible search score as proposed below can be very efficient and can eliminate documents for which even the maximum possible search score would be too low to report in the search result set. Furthermore, the maximum possible search score is used in calculating and scaling the final search score in the novel algorithm described below. Therefore, calculating the maximum possible search score can not only improve the efficiency of the search algorithm, thereby requiring less processing power and processing time compared to other search algorithms, but the maximum possible search score calculated at this stage can be reused later to calculate the normalized version of the final matrix score for a document. While the embodiment of FIG. 6 is specifically described in the context of calculating a matrix score, it can also be used in to streamline the calculation of other factors of the overall search score described in FIG. 2.

The method may include receiving a search query (602). The search query may be broken up into one or more tokens representing individual words, symbols, or concepts represented in the search query. Each search token can be used to generate a search component as described above. Each search components may have one or more slots associated with it, with each slot representing a specific word/concept combination derived from the token. The slots may be ordered such that higher slots are closer to the original wording/meaning in the search query, and lower slots are farther away from the original wording/meaning.

The method may also include accessing a first data set (604). The search algorithms described in this disclosure can be broadly applied to any collection of data stored in any form. This may include documents, PDFs, databases, images, webpages, FAQs, comment sections, blog posts, and so forth. Therefore, each of these terms may be used interchangeably with the more-general term "data set." In some embodiments, data sets may be stored in a data set collection, such as a set of webpages in a web domain, a set of question/answer pairs in an FAQ, a set of tables in a database, and so forth. When the method accesses a first data set, it may be accessing a first data set in a collection of data sets.

As described above, the first data set can be divided into a plurality of scopes. An example of such a scope will be described in detail below. Generally, scopes can be considered a collection of tokens that are logically grouped in the original data set. For example, a scope might include a single row in a database table. A scope may include a sentence in a text document. A scope may include an answer in an FAQ, and so forth. The first data set can be logically separated into one or more scopes that can then be individually analyzed and compared to the search components derived from the search query.

The method may additionally include calculating a maximum possible score for the first data set (608). An example of calculating the maximum possible search score is described in greater detail below. Generally, calculating a maximum possible search score is less processor-intensive than calculating a full search score for the document. Furthermore, the maximum possible search score can be used to normalize the full search score and generate a ratio between 0.0 and 0.1.

The method can determine whether the maximum possible search score exceeds a threshold (610). The threshold may be an absolute score, such as 740. In some embodiments, the threshold may be dynamically determined such that a certain percentage of data sets pass the threshold and a certain percentage of the data sets fall below the threshold. This thresholding operation can save considerable processing time during the search process by eliminating the need to calculate full search scores for what sometimes may be a large subset of documents that could not possibly generate a search score high enough to be relevant.

If the maximum possible search score exceeds the threshold, then the method may include calculating a search score for the first data set (616). An example of calculating the full search score for a data set is described in greater detail below. After the search score is calculated, or after the method determines that the maximum possible search score does not exceed the threshold, a determination can be made as to whether more data sets are available in the data collection (612). If additional data sets are available, the next data set can be accessed (614), and the method can calculate the maximum possible search score for the next data set (608). When no more data sets are available, the method can provide search results based on the calculated full search scores (618).

It should be appreciated that the specific steps illustrated in FIG. 6 provide particular methods of generating search scores for documents according to various embodiments of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
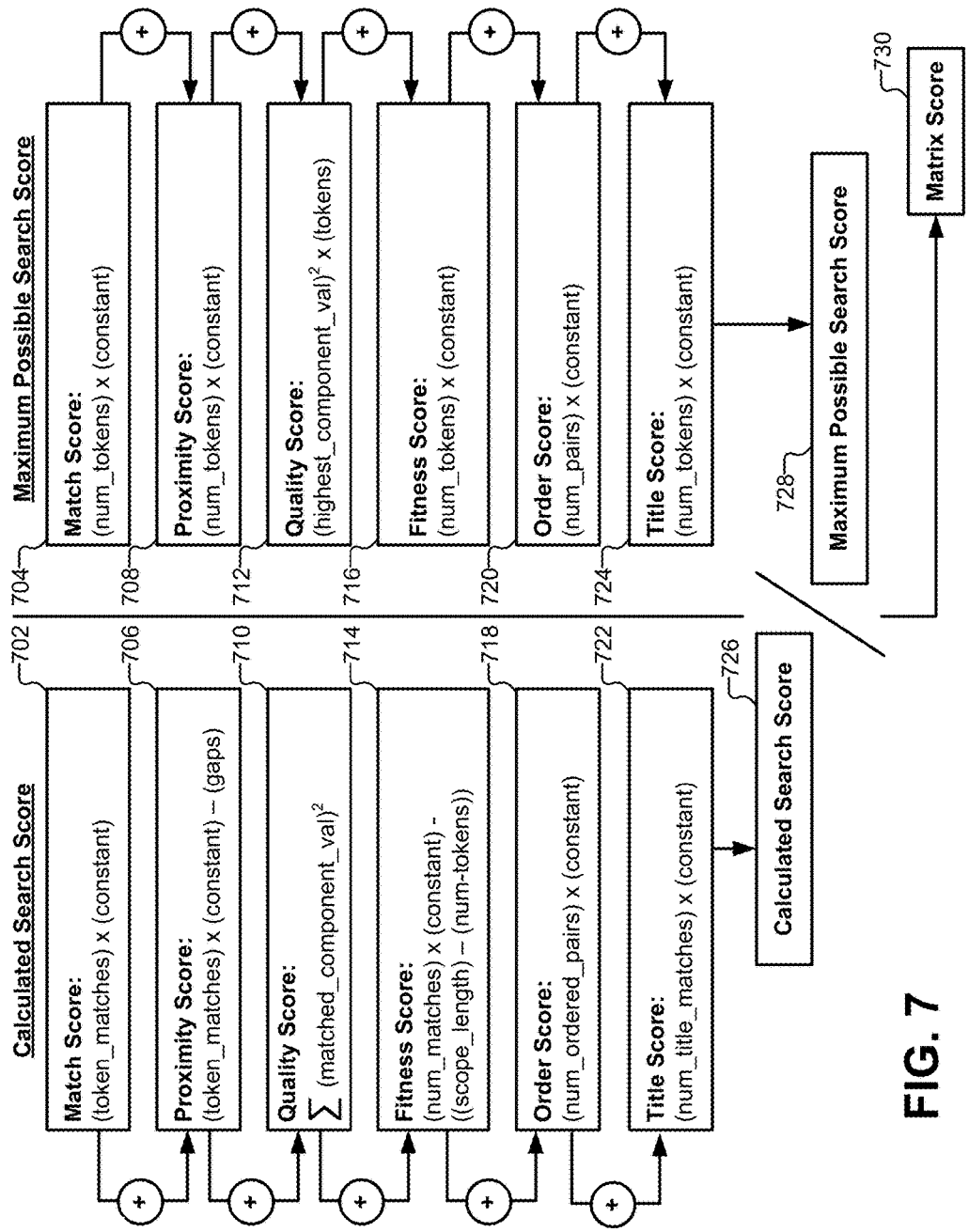
FIG. 7 illustrates a process flow for calculating a maximum possible search score as well as a full search score, according to some embodiments.

FIG. 7 illustrates a process flow for calculating a maximum possible search score as well as a full search score, according to some embodiments. The left-hand side of the process flow shows a process for calculating a search score, while the right-hand side of the process flow shows a process for calculating a maximum possible search score. According to the method of FIG. 6, the maximum possible search score may be calculated first and used to qualify the data set before calculating the search score. To calculate the maximum possible search score, a number of individual factor scores are added together to generate a total maximum possible search score. Each factor is scored for each scope in a document, and in some embodiments, the highest-scoring scope in the document is used to calculate the matrix score. Because the matrix score is concerned with identifying and emphasizing exact matches between the data set and the search query, the highest scoring scope will represent the best exact match in the data set. Each factor will now be described in detail as they are used to calculate both the search score and the maximum possible search score. Again, these scores are calculated in the context of generating a matrix score of FIG. 3.

One factor is referred to as a match score, which describes the number of search components matched to tokens in a candidate scope. The match score 702 can include the number of search component slots matched to tokens in the data set. The number of slots can then be multiplied by a constant to generate the match score. The match score 704 for the maximum possible search score would include the number of tokens in the search query multiplied by the same constant. In some embodiments, the constant used to calculate the match scores may be set to 0.0. This is because the number of token matches is also an inherent value in many of the other factors described below. By adding the match score with a non-zero constant multiplier, the algorithm may tend to overemphasize matched tokens relative to the exact matches for which the matrix score is designed to emphasize.

Another factor is referred to as a proximity score, which describes how close together matched tokens are in the data set. The algorithm may find the smallest range that includes all matches. To calculate the maximum possible proximity score 708, the number of tokens in the search query is multiplied by a constant. To calculate the proximity score 706, the actual number of token matches is multiplied by a constant, then reduced by the gaps between the smallest range that includes all of the matched tokens. An example of how the proximity score is calculated is described below in relation to FIG. 9. This process is greatly simplified by using the matrix representation described below. Instead of counting words, letters, white space, word sizes, etc., the matrix can simply use integer arithmetic to count the number of matrix columns representing tokens fall between each match.

Another factor is referred to as a quality score, which describes how far away from the original terminology and meaning of the search query the algorithm had to travel in order to make a match in the data set. In other words, the quality score can be based on how well the search components matched the tokens of the candidate scope in the data set. To calculate the maximum possible quality score 712, the highest slot value is squared and multiplied by the number of tokens in the search query. To calculate the quality score 710, the squares of each slot value matched to the scope are aggregated. Recall that the slot values descendent value as the tokens/meanings in the slots move farther away from the original (e.g., 10, 9, 8, . . . etc.). Because the slot values are squared, this makes the falloff nonlinear as the algorithm descends down through the slots in order to find matches in the data set. This has the effect of heavily favoring exact matches that are close to the original terminology/meaning in the search query.

Another factor is referred to as a fitness score, which compares the length of the scope in the data set to the length of the search string. This factor attempts to measure whether the search string is "too small" compared to the scope. To calculate the maximum possible fitness score 716, the number of tokens is multiplied by a constant value. To calculate the fitness score 714 the number of matches is multiplied by the same constant value, then reduced by the difference between the scope length and the query length measured in tokens.

Another factor is referred to as an order score, which evaluates whether the search tokens appear in the same order in the data set. Order is the relative position in terms in the query versus the matched terms in the candidate scope. Instead of calculating exhaustively whether each term appears in order relative to the others, some embodiments may use a shortcut that divides the query tokens into a series of ordered pairs. For example, tokens [abcd] would be broken up into ordered pairs [ab], [bc], [cd]. The algorithm then determines whether the first token in each order pair ever occurs before the second. To calculate the maximum possible order score 720, the number of ordered pairs is multiplied by a constant. To calculate the order score 718, the number of ordered pairs that appear in the correct order as described above are multiplied by the same constant.

Another factor is referred to as a title score. Simply put, matches that occur in the title of document can be more heavily favored then matches that occur in a body of a document. To calculate the maximum possible title score 724, the number of tokens in the search query can be multiplied by a constant. To calculate the actual title score 722, the number of matches in the title can be multiplied by the same constant.

In order to normalize the calculated search score 726, it can be divided by the maximum possible search score 728. This will generate a final matrix score 730 between 0.0 and 1.0. This matrix score can then be fed into the calculation of the overall search score illustrated in FIG. 3. In order to clarify how the calculation of the matrix score described above is carried out, the following figures will present a detailed example of the calculations involved. However, it will be understood that FIGS. 8-11 are provided merely by way of example and are not meant to be limiting.

FIG. 8 illustrates a candidate scope 802 from a data set, according to some embodiments. The candidate scope 802 will be compared to the search query string "configure explicit routing." First, the candidate scope can be dissected into a plurality of individual tokens 804. In this case, hyphenated words, punctuation, and individual words are all considered separate tokens. It will be understood that some embodiments may be configured to maintain hyphenated words as a complete token (e.g., e-mail would remain as <e-mail>) in order to preserve meanings.

After dividing the candidate scope 802 into a plurality of tokens 804, a matrix representation can be generated to represent matches between the search components and the tokens 804. Because there are a number of factors that need to be considered for the matrix score, each would normally require using text search functions to search through the candidate scope 802 to find matches, to count words, to count gaps, and so forth. By instead representing the tokens 804 and search components as a two-dimensional matrix, these functions are reduced to simple integer math, which requires far less processing power.

Figure 9:
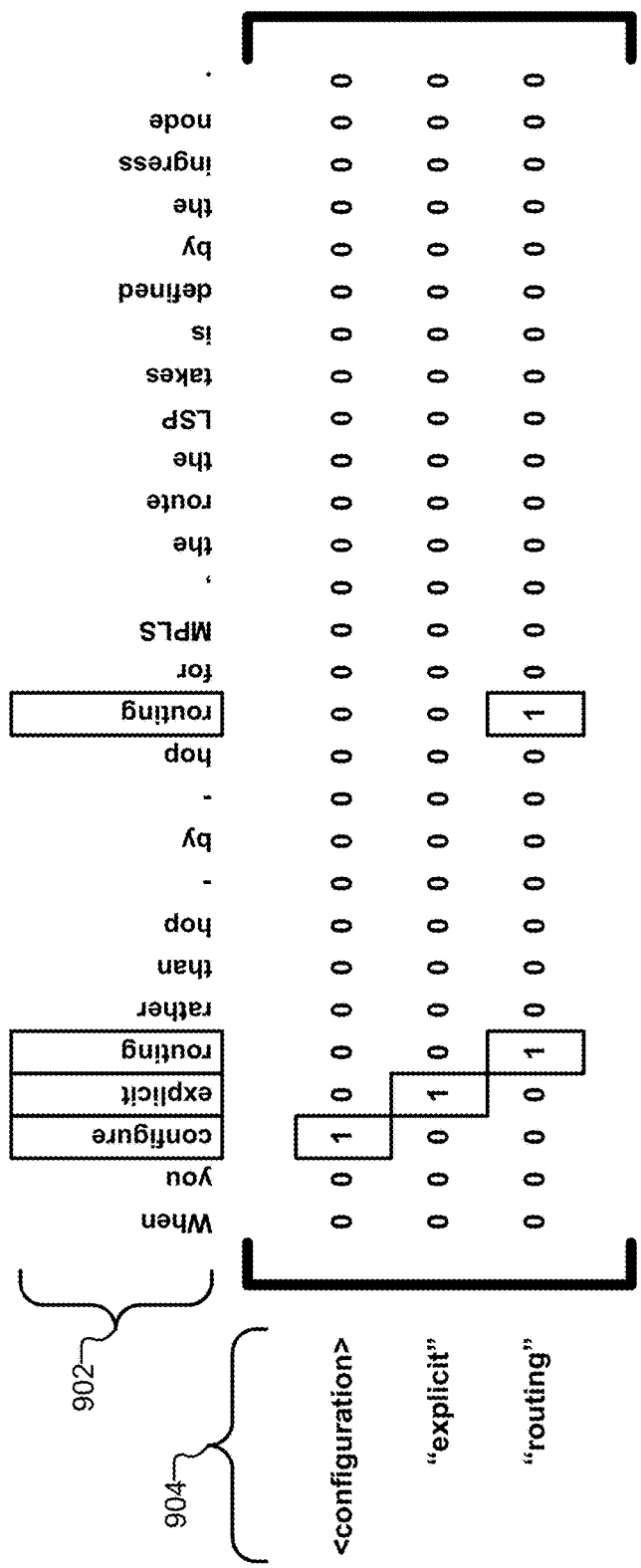
FIG. 9 illustrates a matrix representation of tokens in a candidate scope and a set of search components, according to some embodiments.

FIG. 9 illustrates a matrix representation of tokens in a candidate scope and a set of search components, according to some embodiments. In this embodiment, one dimension 902 of the matrix (e.g., columns) can represent the individual tokens in the candidate scope. The other dimension 904 (e.g., rows) can represent the tokens or search components from the search query. The matrix can be initialized to have zero values in each entry. The algorithm can then iterate through each of the search components and determine whether the search components match any of the tokens in the data set in dimension 902. On match is found, the 0 can be replaced by a 1.

Simple matrix functions and matrix arithmetic can then be used to determine how many matches have been found, where those matches are located in the candidate scope, and the relative distance between an ordering of those matches. This representation greatly simplifies the calculations involved for many the factors described above in calculating a matrix score. For example, to calculate in the proximity factor, matrix row operations can be used to count the number of columns between the smallest range containing each search component in dimension 904. To count the number of matches, the sum of the matrix rows/columns can be quickly calculated using integer math.

The entire two-dimensional matrix illustrated in FIG. 9 can be represented in memory in a number of different ways. In some embodiments, a two-dimensional array is used with an entry for each matrix location. In other embodiments, particularly where the matrix is relatively large and/or sparse, the locations populated with a "1" can be represented using mapped memory locations that correspond to a location in a virtual matrix, thereby reducing the amount of memory needed to perform matrix calculations.

Figure 10:
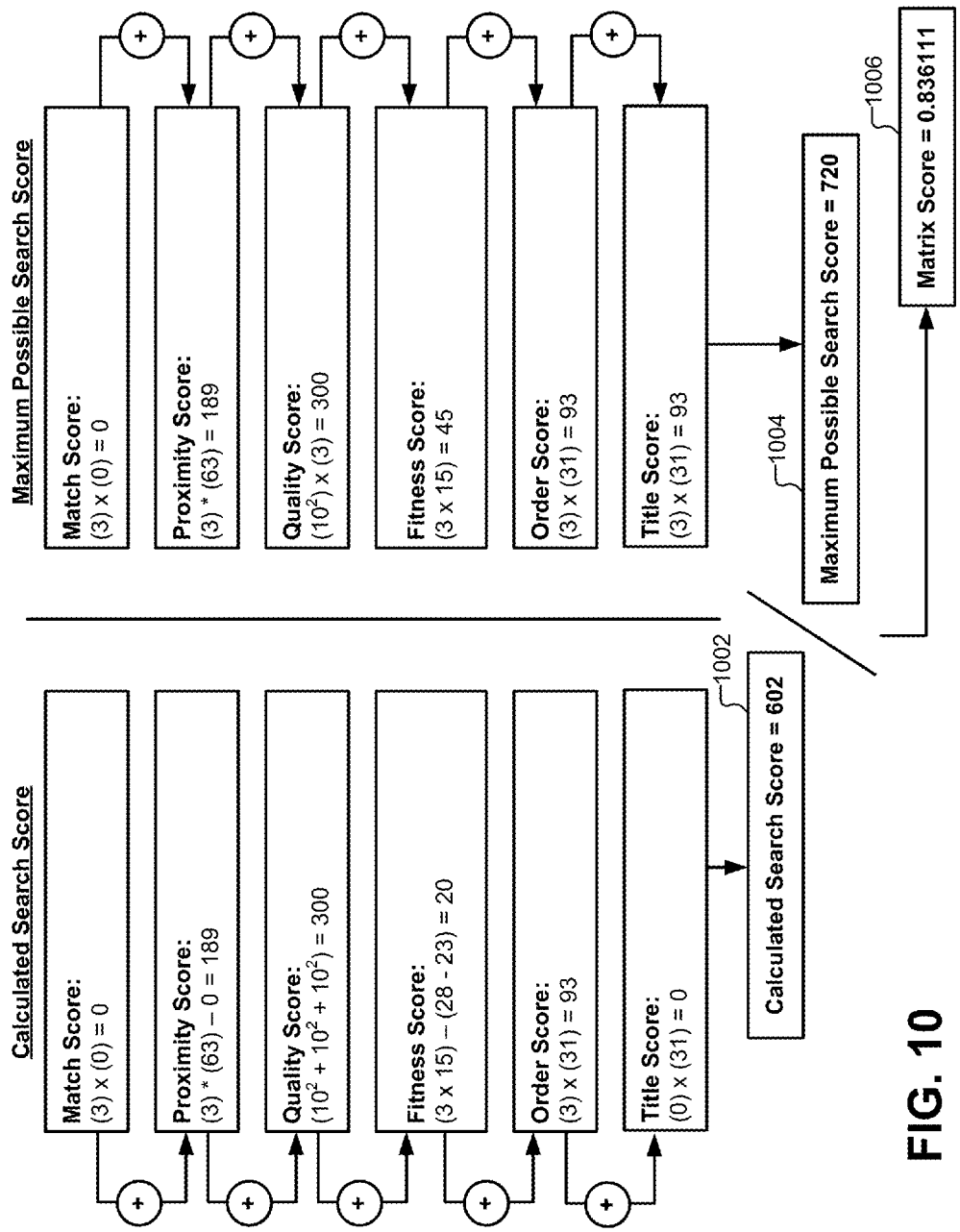
FIG. 10 illustrates an example of the calculations performed for a matrix score, according to some embodiments.

FIG. 10 illustrates an example of the calculations performed for a matrix score, according to some embodiments. For the first three factors, the calculated score matches the maximum possible search score. For example, all three search components in the search query ("configure explicit routing") were matched with tokens in the candidate scope. The match score uses the constant "0" for the reasons described above. There are no gaps between the matched search components in the candidate scope, therefore the proximity score is also a maximum. The matches were obtained using the "10" slot in each of the search components, placing the quality score also a maximum. Because the exact search terminology appeared in order in the candidate scope, the order score is also at a maximum. Because the length of the scope is considerably longer than the length of the search query, the fitness score is reduced from the maximum of 45 down to 20. Finally, the title score is at 0, as no matches were found in the title. The final matrix score 1006 is calculated by dividing the calculated search score 1002 by the maximum possible search score 1004.

In some embodiments, the constant values selected for the calculations performed in FIG. 10 use powers of 2 reduced by 1. For example, $63=2^6-1$, and $31=2^5-1$. These causes were selected in view of the dissenting slots of the search components of FIG. 4. By using powers of 2 reduced by 1, two matches of a lower slot will still be less than a single match of a higher slot. One having skill in the art could select other constants based on the specific needs of their application.

Figure 11:
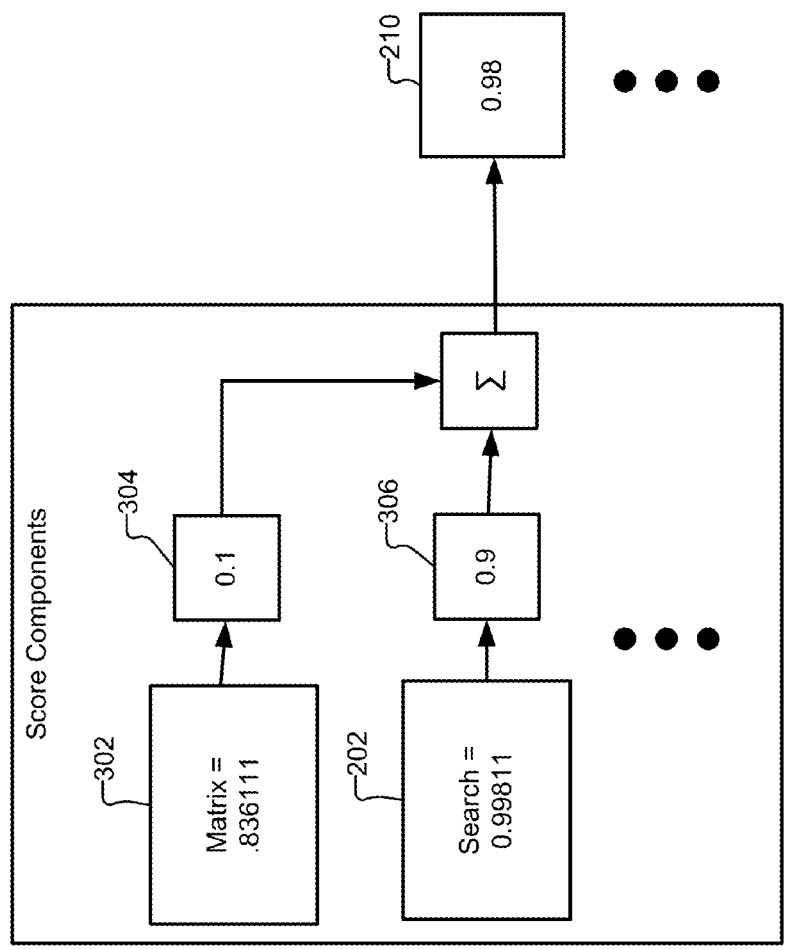
FIG. 11 illustrates how the matrix score can be incorporated into the calculation of the overall search score, according to some embodiments.

FIG. 11 illustrates how the matrix score can be incorporated into the calculation of the overall search score, according to some embodiments. FIG. 11 is an excerpt of FIG. 3. Using the matrix score calculated in FIG. 10. Because an exact match was found in the candidate scope, the matrix score is relatively high at 0.8361, which has the effect of maintaining a high search score that was found using the scoring method described in relation to FIG. 2. In other examples where the exact match is not found in the candidate scope, the matrix score 302 will be significantly lower, which may have the overall effect of lowering the search score 210 for a particular data set.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 12:
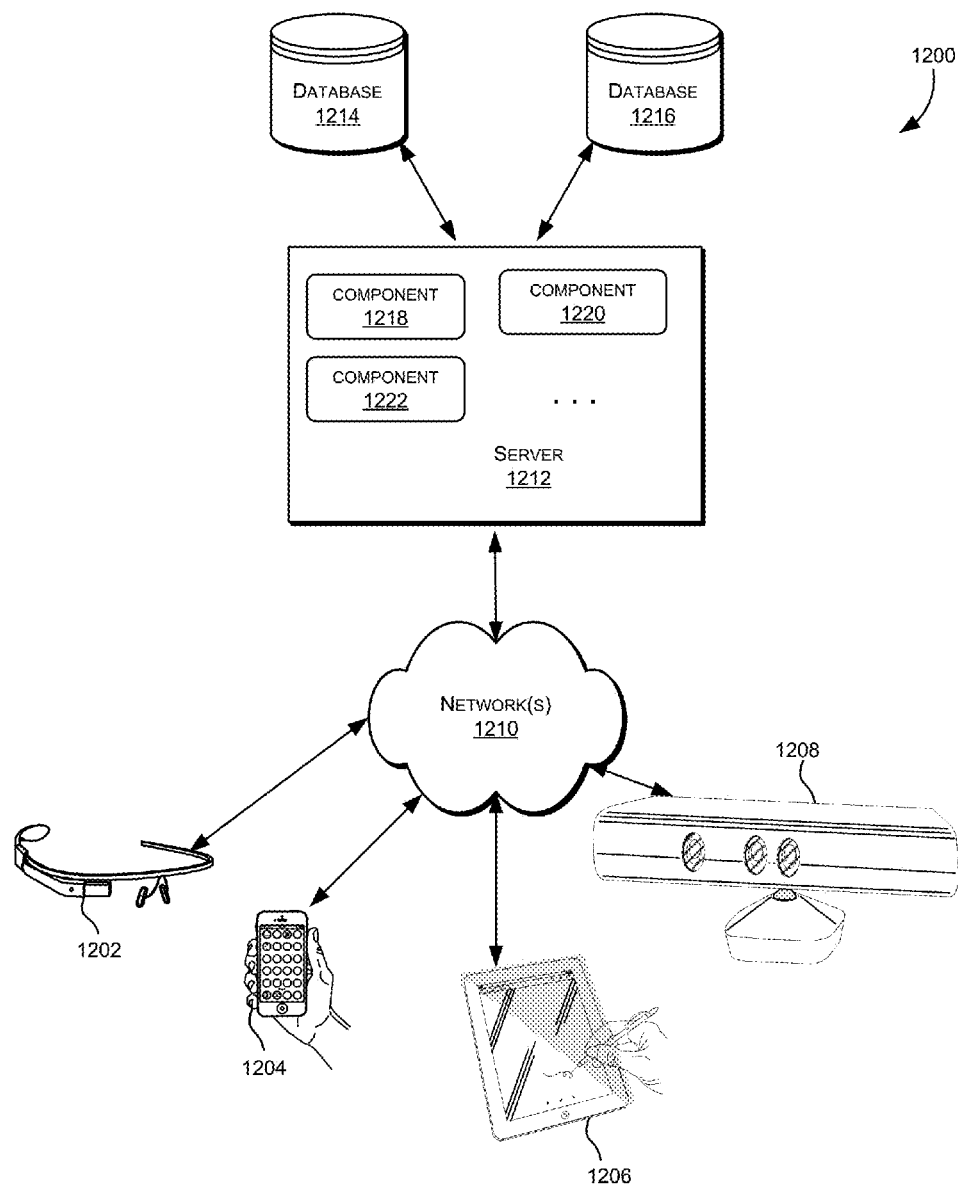
FIG. 12 illustrates a simplified block diagram of a distributed system for implementing some of the embodiments.

FIG. 12 depicts a simplified diagram of a distributed system 1200 for implementing one of the embodiments. In the illustrated embodiment, distributed system 1200 includes one or more client computing devices 1202, 1204, 1206, and 1208, which are configured to execute and operate a client application such as a web browser, proprietary client (e.g., Oracle Forms), or the like over one or more network(s) 1210. Server 1212 may be communicatively coupled with remote client computing devices 1202, 1204, 1206, and 1208 via network 1210.

In various embodiments, server 1212 may be adapted to run one or more services or software applications provided by one or more of the components of the system. In some embodiments, these services may be offered as web-based or cloud services or under a Software as a Service (SaaS) model to the users of client computing devices 1202, 1204, 1206, and/or 1208. Users operating client computing devices 1202, 1204, 1206, and/or 1208 may in turn utilize one or more client applications to interact with server 1212 to utilize the services provided by these components.

In the configuration depicted in the figure, the software components 1218, 1220 and 1222 of system 1200 are shown as being implemented on server 1212. In other embodiments, one or more of the components of system 1200 and/or the services provided by these components may also be implemented by one or more of the client computing devices 1202, 1204, 1206, and/or 1208. Users operating the client computing devices may then utilize one or more client applications to use the services provided by these components. These components may be implemented in hardware, firmware, software, or combinations thereof. It should be appreciated that various different system configurations are possible, which may be different from distributed system 1200. The embodiment shown in the figure is thus one example of a distributed system for implementing an embodiment system and is not intended to be limiting.

Client computing devices 1202, 1204, 1206, and/or 1208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1202, 1204, 1206, and 1208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1210.

Although exemplary distributed system 1200 is shown with four client computing devices, any number of client computing devices may be supported. Other devices, such as devices with sensors, etc., may interact with server 1212.

Network(s) 1210 in distributed system 1200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1210 can be a local area network (LAN), such as one based on Ethernet, Token-Ring and/or the like. Network(s) 1210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1212 may be adapted to run one or more services or software applications described in the foregoing disclosure. For example, server 1212 may correspond to a server for performing processing described above according to an embodiment of the present disclosure.

Server 1212 may run an operating system including any of those discussed above, as well as any commercially available server operating system. Server 1212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1212 may include one or more applications to analyze and consolidate data feeds and/or event updates received from users of client computing devices 1202, 1204, 1206, and 1208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1212 may also include one or more applications to display the data feeds and/or real-time events via one or more display devices of client computing devices 1202, 1204, 1206, and 1208.

Distributed system 1200 may also include one or more databases 1214 and 1216. Databases 1214 and 1216 may reside in a variety of locations. By way of example, one or more of databases 1214 and 1216 may reside on a non-transitory storage medium local to (and/or resident in) server 1212. Alternatively, databases 1214 and 1216 may be remote from server 1212 and in communication with server 1212 via a network-based or dedicated connection. In one set of embodiments, databases 1214 and 1216 may reside in a storage-area network (SAN). Similarly, any necessary files for performing the functions attributed to server 1212 may be stored locally on server 1212 and/or remotely, as appropriate. In one set of embodiments, databases 1214 and 1216 may include relational databases, such as databases provided by Oracle, that are adapted to store, update, and retrieve data in response to SQL-formatted commands.

Figure 13:
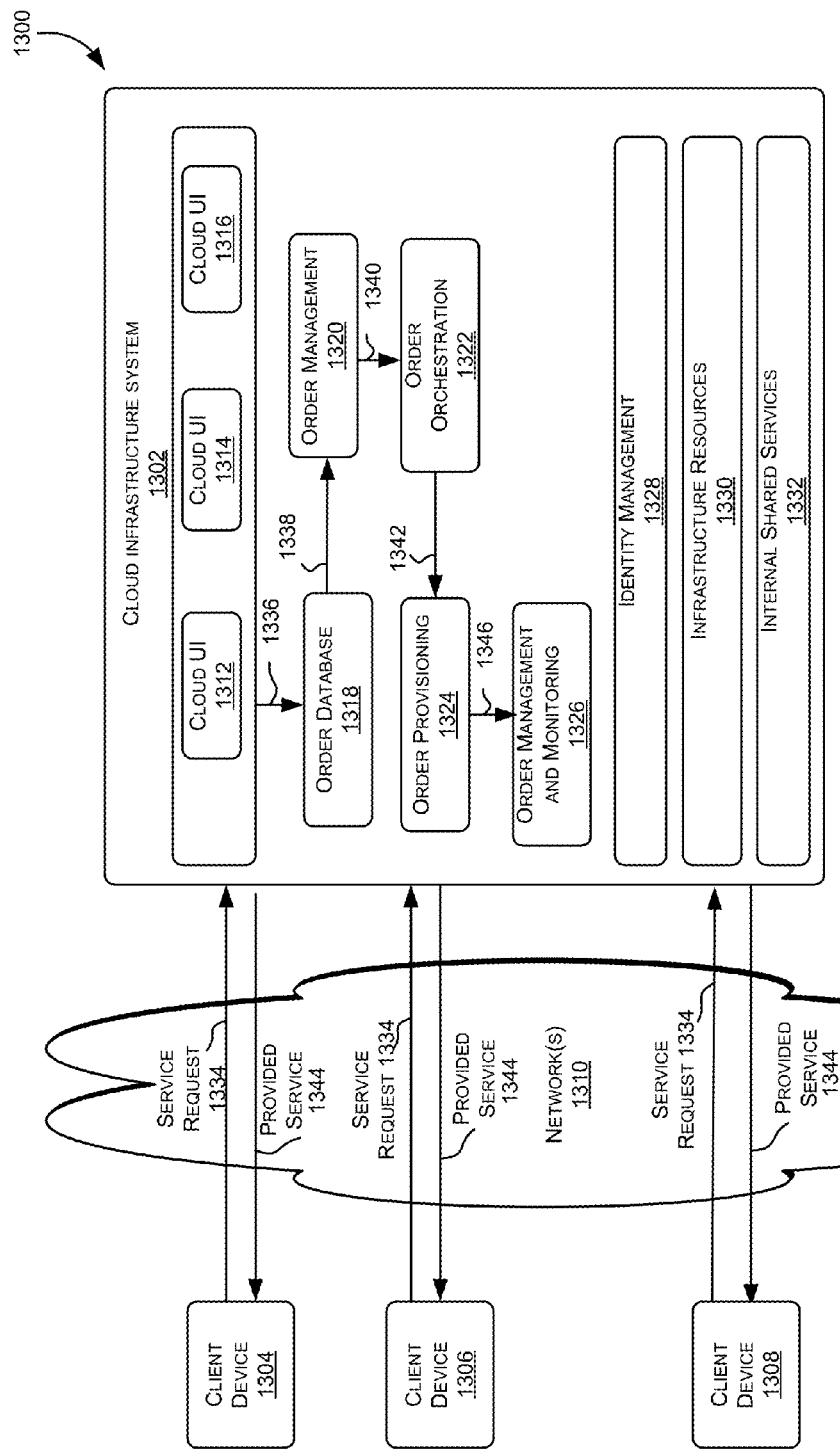
FIG. 13 illustrates a simplified block diagram of components of a system environment by which services provided by the components of an embodiment system may be offered as cloud services.

FIG. 13 is a simplified block diagram of one or more components of a system environment 1300 by which services provided by one or more components of an embodiment system may be offered as cloud services, in accordance with an embodiment of the present disclosure. In the illustrated embodiment, system environment 1300 includes one or more client computing devices 1304, 1306, and 1308 that may be used by users to interact with a cloud infrastructure system 1302 that provides cloud services. The client computing devices may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302.

It should be appreciated that cloud infrastructure system 1302 depicted in the figure may have other components than those depicted. Further, the embodiment shown in the figure is only one example of a cloud infrastructure system that may incorporate an embodiment of the invention. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1202, 1204, 1206, and 1208.

Although exemplary system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1210.

Cloud infrastructure system 1302 may comprise one or more computers and/or servers that may include those described above for server 1212.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform.

In some embodiments, resources in cloud infrastructure system 1302 may be shared by multiple users and dynamically re-allocated per demand. Additionally, resources may be allocated to users in different time zones. For example, cloud infrastructure system 1330 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 and by the services provided by cloud infrastructure system 1302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in the figure, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In exemplary operation 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI), cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

After an order has been placed by the customer, the order information is received via the cloud UIs, 1312, 1314 and/or 1316.

At operation 1336, the order is stored in order database 1318. Order database 1318 can be one of several databases operated by cloud infrastructure system 1318 and operated in conjunction with other system elements.

At operation 1338, the order information is forwarded to an order management module 1320. In some instances, order management module 1320 may be configured to perform billing and accounting functions related to the order, such as verifying the order, and upon verification, booking the order.

At operation 1340, information regarding the order is communicated to an order orchestration module 1322. Order orchestration module 1322 may utilize the order information to orchestrate the provisioning of services and resources for the order placed by the customer. In some instances, order orchestration module 1322 may orchestrate the provisioning of resources to support the subscribed services using the services of order provisioning module 1324.

In certain embodiments, order orchestration module 1322 enables the management of business processes associated with each order and applies business logic to determine whether an order should proceed to provisioning. At operation 1342, upon receiving an order for a new subscription, order orchestration module 1322 sends a request to order provisioning module 1324 to allocate resources and configure those resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. Order orchestration module 1322 may thus be isolated from implementation details, such as whether or not services and resources are actually provisioned on the fly or pre-provisioned and only allocated/assigned upon request.

At operation 1344, once the services and resources are provisioned, a notification of the provided service may be sent to customers on client devices 1304, 1306 and/or 1308 by order provisioning module 1324 of cloud infrastructure system 1302.

At operation 1346, the customer's subscription order may be managed and tracked by an order management and monitoring module 1326. In some instances, order management and monitoring module 1326 may be configured to collect usage statistics for the services in the subscription order, such as the amount of storage used, the amount data transferred, the number of users, and the amount of system up time and system down time.

In certain embodiments, cloud infrastructure system 1300 may include an identity management module 1328. Identity management module 1328 may be configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

FIG. 14 illustrates an exemplary computer system 1400, in which various embodiments of the present invention may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present invention.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of searching a plurality of data sets with a search query, the method comprising:
    receiving the search query, wherein the search query comprises one or more tokens;
    accessing the plurality of data sets;
    calculating maximum possible search scores for each of the plurality of data sets, wherein a number of individual factor scores (i) are determined for a selected data set and (ii) are added together to generate the maximum possible search score for the selected data set;
    identifying a subset of the plurality of data sets for which the corresponding maximum possible search scores exceed a threshold score;
    calculating search scores for the subset of the plurality of data sets comprising:
        dividing a first data set in the subset into a plurality of scopes;
        generating search scores for each of the plurality of scopes by comparing each of the plurality of scopes to the search query; and
        using a largest search score from the plurality of scopes to generate a matrix score for the first data set; and
    providing a result list based on the search scores.

2. The method of claim 1, wherein calculating the search scores for the subset of the plurality of data sets further comprises:
    dividing the largest search score from the plurality of scopes by a maximum possible search score for the first data set.

3. The method of claim 1, wherein the matrix score contributes approximately 10% to a search score of the first data set.

4. The method of claim 1, wherein calculating the maximum possible search scores comprises:
    calculating a match score component comprising a number of tokens in the search query multiplied by a constant.

5. A non-transitory, computer-readable medium comprising instructions that, when executed by one or more processors, cause the one or more processors to perform operations comprising:
    receiving a search query, wherein the search query comprises one or more tokens;
    accessing a plurality of data sets;
    calculating maximum possible search scores for each of the plurality of data sets, wherein a number of individual factor scores are determined for a selected data set and are added together to generate the maximum possible search score for the selected data set;
    identifying a subset of the plurality of data sets for which the corresponding maximum possible search scores exceed a threshold score;
    calculating search scores for the subset of the plurality of data sets comprising:
        dividing a first data set in the subset into a plurality of scopes;
        generating search scores for each of the plurality of scopes by comparing each of the plurality of scopes to the search query; and
        using a largest search score from the plurality of scopes to generate a matrix score for the first data set; and
    providing a result list based on the search scores.

6. The non-transitory, computer-readable medium according to claim 5 wherein one of the individual factor scores for calculating the maximum possible search scores comprises:
    calculating a proximity score component comprising a number of tokens in the search query multiplied by a constant.

7. The non-transitory, computer-readable medium according to claim 5 wherein one of the individual factor scores for calculating the maximum possible search scores comprises:

calculating a quality score component comprising a square of a highest possible slot value for tokens in the search query multiplied by a number of tokens in the search query.

8. The non-transitory, computer-readable medium according to claim 5 wherein one of the individual factor scores for calculating the maximum possible search scores comprises:

calculating an order score component comprising a number of ordered pairs in tokens in the search query multiplied by a constant.

9. The non-transitory, computer-readable medium according to claim 5 wherein calculating the search scores comprises:

calculating a match score component comprising a number of tokens in the search query matched in a scope of one of the plurality of data sets multiplied by a constant.

10. The non-transitory, computer-readable medium according to claim 5 wherein calculating the search scores comprises:

calculating a proximity score component comprising a number of tokens in the search query matched in a scope of one of the plurality of data sets multiplied by a constant and reduced by a number of gaps between matched tokens.

11. The non-transitory, computer-readable medium according to claim 5 wherein calculating the search scores comprises:

calculating a quality score component comprising a sum of squares of slot values of tokens in the search query matched in a scope of one of the plurality of data sets.

12. A system comprising:

one or more processors; and one or more memory devices comprising instructions that, when executed by the one or more processors, cause the one or more processors to perform operations comprising:

receiving a search query, wherein the search query comprises one or more tokens;

accessing a plurality of data sets;

calculating maximum possible search scores for each of the plurality of data sets, wherein a number of individual factor scores are determined for a selected data set and are added together to generate the maximum possible search score for the selected data set;

identifying a subset of the plurality of data sets for which the corresponding maximum possible search scores exceed a threshold score;

calculating a search score for each data set from the subset of the plurality of data sets;

wherein calculating the search score includes at least calculating a fitness score component for each data set comprising a number of matched tokens in the search query multiplied by a constant, reduced by a difference between a scope length and the number of matched tokens in the search query; and providing a result list based on the search scores.

13. The system of claim 12, wherein calculating the search scores comprises:

generating a two-dimensional matrix, wherein a first dimension represents tokens in the search query, and a second dimension represents tokens found in a scope of one of the plurality of data sets.

14. The system of claim 13, wherein the two-dimensional matrix is represented in memory using a plurality of memory maps for occupied entries in the two-dimensional matrix.

15. The system of claim 12, wherein calculating the search scores comprises:

calculating an order score component comprising a number of matched ordered pairs of tokens in the search query multiplied by a constant.

16. The system of claim 12, wherein calculating the search scores comprises:

calculating a title score component comprising a number of tokens in the search query matched in a title of one of the plurality of data sets multiplied by a constant.

* * * * *

UNITED STATES PATENT AND TRADEMARK OFFICE
CERTIFICATE OF CORRECTION

PATENT NO. : 10,380,124 B2
APPLICATION NO. : 15/286605
DATED : August 13, 2019
INVENTOR(S) : Gage et al.

Page 1 of 1

It is certified that error appears in the above-identified patent and that said Letters Patent is hereby corrected as shown below:

On the Title Page

Column 2, Item (57), under Abstract, Line 11, after "providing" delete "the".

In the Specification

In Column 1, Line 26, delete "andcalculating" and insert -- and calculating --, therefor.

In Column 1, Line 32, after "providing" delete "the".

In Column 1, Line 46, after "providing" delete "the".

In Column 1, Line 60, after "providing" delete "the".

In Column 3, Line 61, delete "meanins." and insert -- meanings. --, therefor.

In Column 24, Line 64, delete "beeen" and insert -- been --, therefor.

Signed and Sealed this
Fourth Day of August, 2020

Andrei Iancu
*Director of the United States Patent and Trademark Office*